United States Patent Office 3,838,011
Patented Sept. 24, 1974

3,838,011
PROCESS AND APPARATUS FOR THE QUANTITATIVE DETERMINATION OF AN ENZYMATICALLY REACTIVE SUBSTANCE
Alexander Hagen and Hans Ulrich Bergmeyer, Tutzing, Upper Bavaria, Wolfgang Gruber, Garatshausen, and Klaus Beaucamp and Dieter Jaworek, Tutzing, Upper Bavaria, Germany, assignors to Boehringer Mannheim GmbH, Mannheim-Waldhof, Germany
Filed June 12, 1972, Ser. No. 261,763
Claims priority, application Germany, June 18, 1971, P 21 30 308.2
Int. Cl. G01n 31/14
U.S. Cl. 195—103.5 R    20 Claims

ABSTRACT OF THE DISCLOSURE

Enzymatically reactive substances contained in aqueous solutions are quantitatively determined by introducing a defined amount of a solution sample containing the substance to be determined and which is free of air bubbles, into a stream of buffer solution in a block-like fashion, wherein the buffer solution contains the reagents necessary for an enzymatic reaction with said substances and flows with constant velocity and wherein the introduction of the block sample does not substantially alter the velocity of flow, contacting the resulting stream with the appropriate enzyme and then passing the stream over a detector to indicate the amount of reaction having occurred, and relating readings from the detector to the amount of the substance to be determined contained in the sample.

---

The present invention is concerned with a process for the quantitative determination of enzymatically reactable substances in aqueous solution by reation thereof in the presence of at least one appropriate enezyme, and is also concerned with a device for carrying out this process.

Enzymatcially reactable substances have to be quantitatively determined very frequently, not only in industry but also in clinical laboratories. Such determinations utilize their property of being selectively reactive with certain enezymes in such a manner that, in an aqueous solution, there is obtained a change which can easily be measured and is proportional to the amount of substance to be determined. This change can, for example, be the appearance or disappearance of certain compounds or the alteration of special properties, such as of the pH value or the like. In the case of such determinations, there is the problem of carrying them out as quickly and simply as possible. In particular, the determinations should be capable of being carried out without the use of special purification and separation processes. With this object in view, automatic analysis devices have been developed in which the desired reactions are allowed to proceed substantially automated and are measured.

However, the methods and devices previously developed for this purpose are still subject to substantial disadvantages. In particular, the rate at which analysis can be carried out is still too small, the introduction of the sample to be analysed involves additional working steps, which substantially influence the exactitude of the results obtained, and the utilization of reagents, especially the utilization of enzymes, is undesirably high.

It is an object of the present invention to overcome these disadvantages and to provide a process and a device which excludes sources of error in the measuring in of the substance to be determined, for example, pipetting and the like, and enables a very high analysis frequency, i.e. analyses per unit time, to be achieved with a minimum utilization of reagents. In particular, it is an object of the present invention to provide a process of the above-mentioned type in which the enzymes are empolyed as catalysts, i.e. substantially without using them up.

Thus, according to the present invention, there is provided a process for the quantitative determination of enzymatically reactable substances in aqueous solution of reaction in the presence of at least one appropriate enzyme and measurement of a change in the solution by means of an appropriate detector.

The process of the invention comprises introducing a defined amount of an air bubble-free solution containing the substance to be determined into a stream in block-like fashion, which stream is flowing with constant velocity, of a buffer solution containing the reagents necessary for the reaction, and then contacting the flowing buffer solution with the enezyme and passing the resulting stream over the detector, whereafter any components which have been used up are, if desired, regenerated and the stream of buffer solution recycled. The introduction of the "block" of test fluid into the buffer occurs without alteration of the velocity of the buffer stream.

The process according to the present invention can be used quite generally for the quantitative det ermination of substances which are enezymatically reactable in aqueous solution, provided that these reactions being about a change in the solution which can be physically measured and is proportional to the reaction or to the amount of the substance to be determined. Such quantitative determinations are also to be understood to include the determinations of enzyme activities. Substances and reactions of this kind are known in large number. Examples of such reactions include those reactions which can be coupled with the oxidation of a reduced nicotinamide-adenine-dinucleotide(NADH or NADPH) that the alteration of the extinction of NADH is proportional to the reaction. In this way, there can be determined, for example, acetaldehyde, pyruvate, sorbose, oxalacetate, $\alpha$-keto-glutarate, glutamate-pyrurvate-transaminase (GPT), glutamate-oxalacetate-transaminase (GOT) and many others.

Other reactions of this type include the determination of urea by means of urease and measurement of the ammonium carbonate formed, for example, by determination of the ammonium ion concentration; reaction of saccharose with invertase and measurement of the optical rotation by means of a polarimeter; fission of lipide by means of lipase with the formation of fatty acids and determination of the change of pH by means of a glass electrode; determination of pyrophosphate by fission by means of pyrophosphatase with the formation of orthophosphate or determination of glucose by the oxidation catalysed by glycose oxidase and measurement of the thermal effect in a calorimeter; oxidation of glucose or galactose, uric acid, xanthine, hypoxanthine, cytochrome A, aminoacids, and polyunsaturated fatty acids with specific oxidases and measurement of the reduction of the oxygen concentration by means of an oxygen electrode; determination of hydrogen peroxide and inorganic peroxides by means of catalase and measurement of the oxygen formed, also by means of an oxygen electrode; determination of aminoacids with aminoacid decarboxylase and measurement of the carbon dioxide formed or of the thermal effect of the reaction by means of a calorimeter; and many others.

Enzymes which can be used for the above reactions with the utilization of oxygen include, for example, glucose oxidase, galactose oxidase, uricase, xanthine oxidase, cytochrome oxidase, aminoacid oxidase and lipoxygenase.

The enzymes used in the process according to the present invention can either be dissolved in the continuously circulating stream of solution or can be used as carrier-bound, insoluble enzymes in particle form in a bed, for example in a column, inserted in the stream of solution. When a dissolved enzyme is used then, by appropriate means, a slight mixing of the sample solution, i.e. of the solution of the substance to be determined, introduced block-like into the circulating stream, is brought about. Such a mixing can be achieved, for example, by producing turbulence in the stream of solution by means of mechanical obstacles. Such a mixing should be as small as possible in order not to reduce the analysis frequency and the sensitivity of the method. It must only take place to such an extent that a contact of the substance to be determined with the substances needed for the reaction is ensured and the pH value desired for the activity of the enzyme is obtained.

When using a carrier-bound insoluble enzyme, which is placed into the stream of solution between the point of introduction of the material to be tested and detector, there is automatically obtained the desired degree of mixing by the mixing or turbulence which occurs in the bed of enzyme. In this case, the mixing can also be kept to a minimum since a satisfactory contact with the enzyme is, in any case, obtained.

When a carrier-bound enzyme is used, its specific activity should be at least 10 U/g. and is preferably more than 50 U/g., in order to avoid a large bed volume and thus too great a mixing of the sample "block" with the buffer solution.

An important feature of the process according to the present invention is the air bubble-free, block-like introduction of the solution, which contains the substance to be determined, into the stream of buffer solution. The test solution should be introduced, with the smallest possible mixing with the stream of buffer solution, in such a manner that it moves in the flowing stream in the manner of a "block" or liquid. An introduction of this kind can be achieved, for example, with the help of a slider provided with a bore, this bore containing a measured amount of the test solution, which latter is introduced into the flowing stream of buffer solution in such a manner that the test solution is carried along in the buffer solution in the manner of a "block."

A further important feature of the process according to the present invention is that a stream of an appropriate buffer solution, flowing with a constant velocity, is used as a carrier and medium for the reaction. By constant velocity there is to be understood such a constancy of the velocity that unavoidable variations of velocity are so small that they are practically not registered by an indicator device connected with the detector. This condition is ideally fulfilled when constant conditions are indicated so long as a sample solution block does not pass the detector. If this constant velocity is not maintained, then a reaction can be falsely indicated by the continuously indicating device connected with the detector. Such an alteration would also be falsely indicated if air bubbles were introduced into the reagent stream with the sample solution.

It is also important that the block-like introduction of the sample solution does not bring about an alteration of the velocity of flow of the stream of buffer solution because this could give rise to a danger of a falsification of the measurement result.

According to a preferred embodiment of the process of the present invention, any components which have been used up are regenerated or replaced after the solution has passed the detector. Since the stream of buffer solution is constantly pumped in circulation, it is advantageous when used up components are again supplemented. If, for example, the process is carried out with the use of a substance to be determined which is oxidized with the utilization of oxygen, then the oxygen content of the buffer solution can again be supplemented by, for example, passing air therethrough. This is expediently carried out in a somewhat larger vessel with an appropriate residence time of the buffer solution. If the substance to be determined is reduced, thus increasing the oxygen content of the solution, the oxygen formed is again removed, for example, by passing an oxygen-free gas, such as nitrogen or a noble gas, through the solution.

If, for example, NADP is reduced to NADPH (as in the case of, for example, the determination of glucose with the coupled hexokinase-glucose-6-phosphate reaction), then the NADPH formed can be continuously reoxidized to NADP by a redox exchanger which is introduced into the stream in a column positioned after the detector.

Reduced pyridine coenzymes (NADH and NADPH) can also be reoxidized with carrier-bound glutamate-dehydrogenase (column in the stream), by adding ammonium ions and α-ketogultarate to the circulating reagent. In general, these substances do not disturb the reaction to be measured.

However, the process of the present invention can also be carried out without continuous regeneration until the reaction components have been used up or the reaction products have accumulated to such an extent that further determination reactions will be disturbed. In such cases, either a discontinuous regeneration is carried out or the buffer solution is replaced.

The buffer solution itself is an aqueous solution of a buffer on conventional concentration, which is appropriate for the particular enzyme used. Appropriate buffers and buffer concentrations, as well as the optimum pH values for the particular enzyme used, are well known.

Apart from the buffering compounds, the buffer solution can also contain other substances which are necessary or desirable for the enzymatic reaction, examples of such other substances including salts, which can contain essential ions, for example magnesium ions, sulfate ions and the like, and/or compound having a stabilizing action, surface-active substances and the like. Furthermore, the buffer solution contains dissolved therein all those substances which are necessary for any coupled reactions which are to proceed simultaneously. In particular, it can contain the enzymes and substrates for reactions of this type. If, for example, glutamate-pyruvate-transaminase (GPT) is to be measured, then L-alanine and α-ketoglutarate are dissolved in the buffer solution and converted into glutamate and pyruvate by the enzyme introduced with the sample. The pyruvate is, in turn, converted in the presence of the adjuvant and indicator enzyme lactate dehydrogenase (LDH) and of NADH into L-lactate, with the formation of $NAD^+$, the alteration of the ultra-violet extinction which appears with the disappearance of NADH being measured. If glutamate-oxalacetate-transaminase (GOT) is to be determined, then L-aspartate and α-ketoglutarate are added to the buffer solution, which are converted by the GOT into oxalacetate and glutamate. The oxalacetate formed is converted into malate with malate dehydrogenase circulating in the stream of solution or present in carrier-bound form, any NADH present in the solution being simultaneously converted back into NAD.

The block-like introduction of the sample solution, without alteration of the velocity of flow of the buffer solution, is preferably carried out by dividing the stream of buffer solution into two part streams which are alternating interrupted, the solution containing the substance to be determined (sample solution) being introduced into the part stream which has been interrupted. It is especially preferred to introduce the sample solution at the point of interruption itself. An excess of sample solution, for example of serum, is preferably added and, by opening the part stream, the excess of separated off. This can, for example, take place in the manner indicated above by inserting into a part stream of the buffer solution, a slider-like device, this slider containing a calibrated bore for the reception of a definite amount of sample solution. By dipping the bore opening of this slider into excess sample solution, for example excess sample serum, or opening the bore to a comparatively large container which contains such a sample solution and allowing the sample to flow in, a measured amount of sample solution is separated off upon sliding the slider and is introduced block-like into the stream of buffer solution when the bore of the slider is so introduced into the interrupted part stream of the buffer solution that the opening of the interrupetd stream takes place through this bore. The other part stream, which up to this point of time has not been interrupted, is preferably simultaneously interrupted, which can take place by means of the same slider.

The device for carrying out the process according to the present invention comprises a buffer reservoir, a sample applicator, a detector with registration device and a pump with constant conveying capacity, the individual components being connected together by tubes in the given order to give a circulating system.

The sample applicator preferably has at least two throughlets which can be closed alternatingly by a stop slider with at least two corresponding bores, one of the bores being connected to an inflow pipe for the solution containing the substance to be determined, when the corresponding throughlets is closed.

According to an especially preferred embodiment, the applicator is connected to a device providing a vacuum, for example a vacuum pump, with which the inlet pipe for the sample solution and the sample bore in the slider can be evacuated.

The applicator preferably comprises a casing containing a slidable core, the casing can core each having three throughlets which can be brought into coincidence by sliding the core. An applicator of this kind preferably has a casing with a first and second inlet bore, a first and second outlet bore, an air inlet bore, a vacuum bore and a sample solution bore, as well as core, slidably arranged in the casing with three bores, which are so arranged that, by sliding the core, the first inlet bore can be connected to the first outlet bore, the second inlet bore to the second outlet bore, the air inlet bore to the vacuum bore and the sample solution bore to the vacuum bore, with the proviso that the first inlet bore cannot be connected with the first outlet bore when the second inlet bore is connected with the second outlet bore.

Furthermore, the device according to the present invention contains a pump with constant conveying capacity which is preferably present in the pipe before or after the applicator. A tube pump can, for example, be used.

Furthermore, the device according to the present invention preferably contains, in the pipe between the applicator and detector, a mixing device which can comprise, for example, a column which contains an enzyme bound to a particulate carrier. When using a dissolved enzyme, the mixing device preferably consists of a simple insert in the pipe which brings about a certain turbulence of the solution flowing through.

The process and device according to the present invention are described in more detail in the following, with reference to the accompanying drawings, in which.

Figure 1:
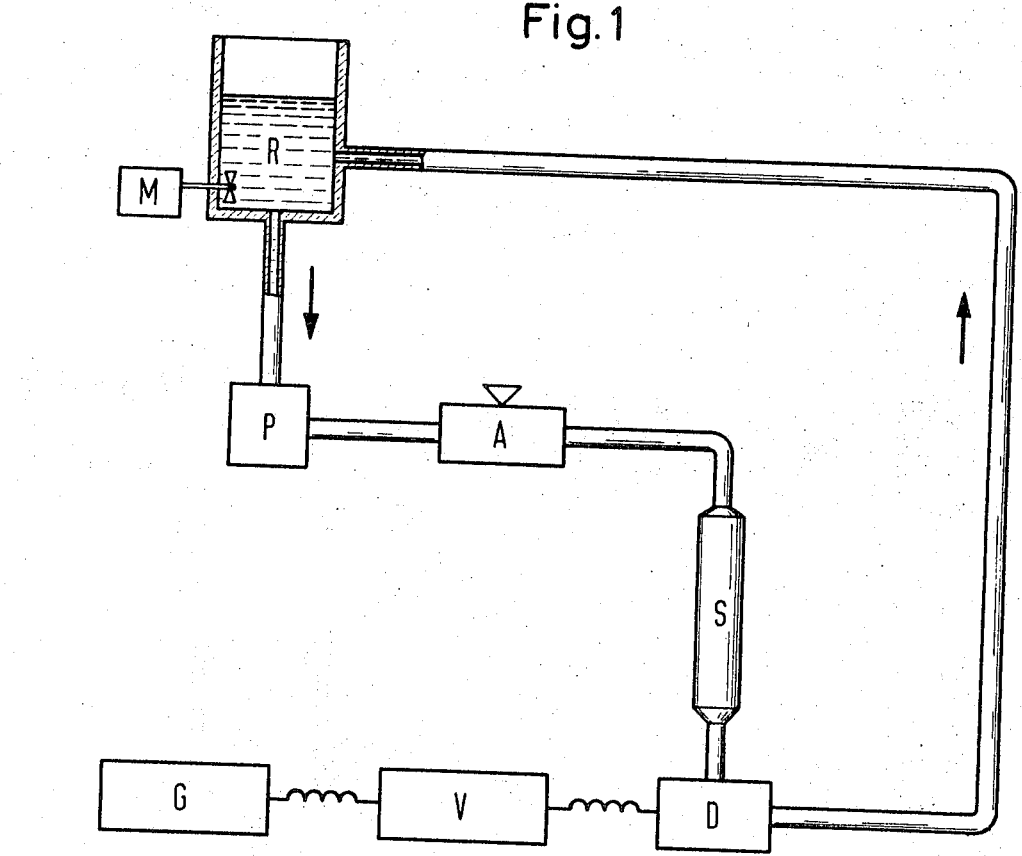
FIG. 1 is a schematic illustration of a device according to the present invention.

Referring now to FIG. 1, a reservoir R contains a supply of buffer solution. A pump P conveys the buffer solution from the reservoir R into a sample applicator A, from there, *via* mixing means S, to a detector D and finally back again into the reservoir R. In the embodiment illustrated in FIG. 1, the detector D is connected to an electronic amplifier V, which amplifies the measurement signal of the detector, and a registration device G, to which the amplified measurement signal is passed and which can be, for example, a recorder.

The reservoir R can consist of any desired material which has an outlet and an inlet for the buffer solution and preferably also an opening for the introduction of the supplementing substances, gases and the like. The reservoir can preferably be thermostatically controlled.

The pump P, which serves to convey the buffer stream and maintain the circulation thereof, can, as already mentioned, be a tube pump or can also be a piston or centrifugal pump. The conveying capacity of the pump can preferably be regulated.

Figure 2:
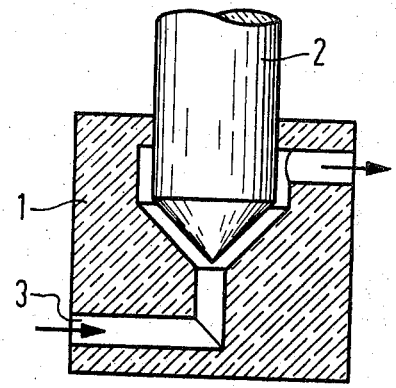
FIG. 2 is a schematic cross-section of means for conducting the stream of buffer solution to a detector.

The detector schematically shown in section in FIG. 2 comprises a flowthrough cell 1, which can preferably be thermostatically controlled. It contains the actual measurement device 2 as well as a solution canal 3 into which the measurement device, for example a measurement electrode, a glass fibre optic or a temperature sensitive device, projects.

The term "amplifier V" is to be understood to include all the functional parts which the measurement electrode needs for operating, namely, a source of current, connections for the source of current, electronic amplification, etc.

The registration device G serves to register the measurement results obtained. Any desired registration device can be used but a recorder is preferred which can be connected to the amplifier V. Instead of the recorder, other analogue or digital apparatus can also be used. For the measurement, it is only necessary to have an indication of the measurement signal in relation to the passage of time.

Figure 3:
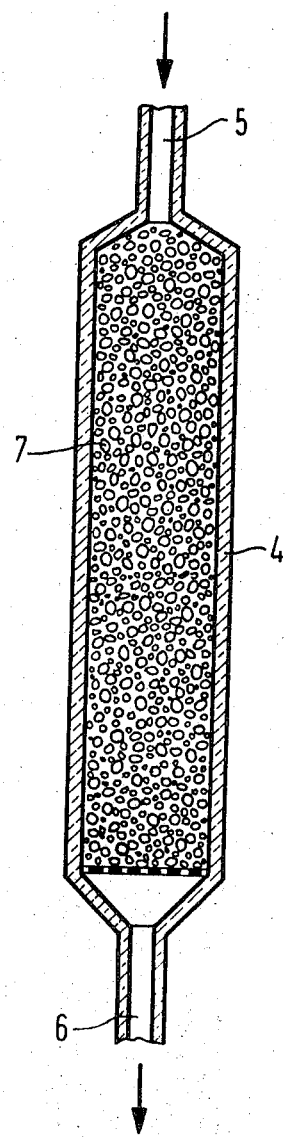
FIG. 3 is a longitudinal section of a mixing device.

The mixing device S shown in section FIG. 3 comprises a column wall 4, which is preferably cylindrical, and is provided at one end with an inflow opening 5 and on the other end with an outflow opening 6 for the buffer solution. The column is filled with granules 7 which consist of inert material or of enzyme bound to a solid, insoluble carrier. The size of the column depends upon the desired degree of mixing of the sample solution and buffer solution, as well as, in the case of a carrier-bound enzyme, upon the desired measurement sensitivity, the amount of sample to be measured and the activity of the enzyme. When a column containing a carrier-bound enzyme is used, then the column is preferably thermostatically controllable. In this case, the column is preferably so constructed that it can be easily changed by screwing on or off if, for example, the activity of the carrier-bound enzyme has decreased or if a change is necessary for any other reason. Such a change can, for example, be necessary in order to adapt the device for the determination of another substance and thus to introduce a different carrier-bound enzyme or in order to alter the degree of mixing of the sample solution and buffer solution when using another method of determination.

As already mentioned hereinbefore, the sample applicator A serves for the air bubble-free, block-like introduction of a sample solution into the stream of buffer. It brings about the measurement of the sample solution and the continuous maintenance of the stream of buffer, without any great variations of velocity.

Figure 4:
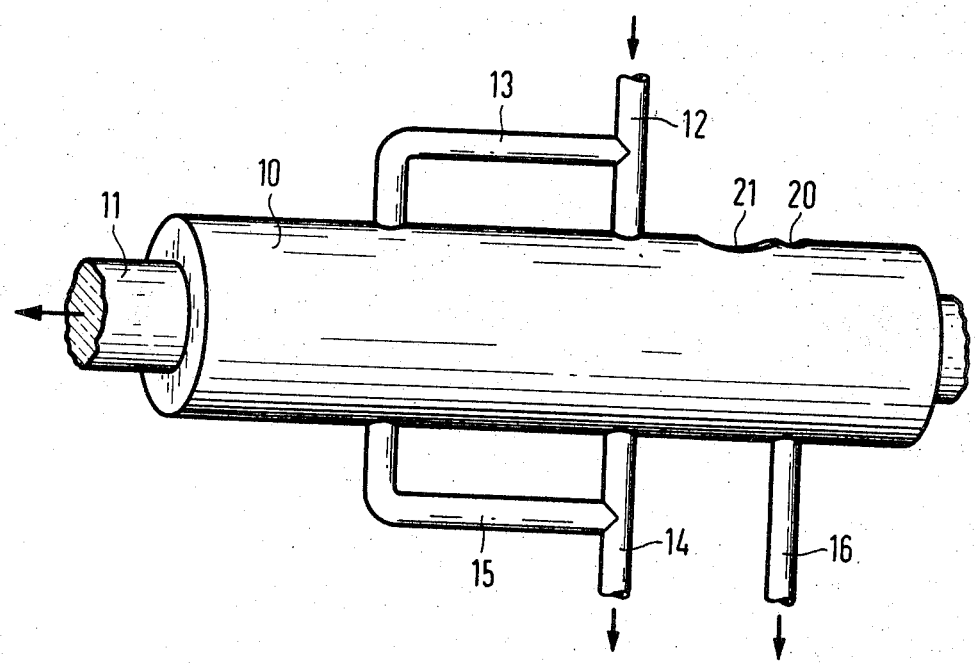
FIGS. 4 and 4a illustrate an applicator according to the present invention with connection pipes, inside view and in cross-section.
Figure 4A:
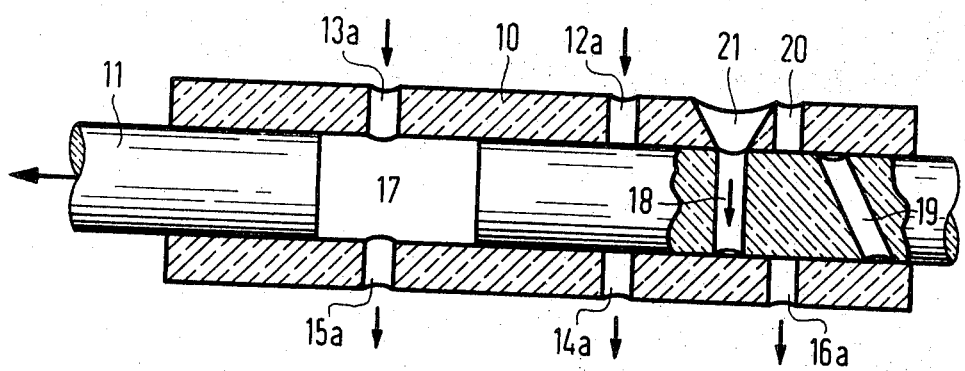

In the embodiment shown in Fig. 4 and 4a, the applicator comprises a casing 10 and a core 11 slidable therein. An inlet pipe 12 for the stream of buffer leads to a bore 12a in the casing 10. A branch pipe 13 from pipe 12 leads to a bore 13a in the casing 10. In the same way, an outlet bore 14, which is connected with a bore 14a and serves as an outlet for the buffer solution, leads from the other side of the casing 10. A branch pipe 15 connects an outlet bore 15a in the casing 10 with the outlet pipe 14. A pipe 16, which is connected with a bore 16a in the casing 10, is connected to a source of vacuum. The slidable core 11 is provided with bores 17, 18 and 19 which, in the case of appropriate positioning of the core 11, can connect each of the bores 12a and 14a, 13a and 15a, as well as 16a, with a bore 17 and a bore 18 with a conical bore 21 in the casing 10.

In the position of the core 11 shown in Fig. 4a, into the conical-shaped opening 21 is poured the sample solution to be investigated, for example serum, which sample solution passes into the bore 18 of the core 11. The amount of sample solution poured into the conical-shaped bore 21 in the casing 10 is of no importance provided that it is sufficient completely to fill the bore 18 in the core 11. While the sample is being introduced, a stream of buffer flows from 13a to 15a via bore 17. After conclusion of the filling, the core is pushed in the direction of the arrow until the bore 18 coincides with the bores 12a and 14a. The sample solution, the volume of which corresponds exactly with the volume of the bore 18 in the core 11, is carried along block-like by the stream of buffer to the column S. In this position of the core 11, the stream from 13a to 15a is interrupted and simultaneously any solution remaining the filling opening 21 is sucked out through the bore 19, bore 16a and pipe 16. As soon as the sample solution has passed into the stream of buffer, the core 11 is pushed counter to the direction of the arrow until the bore 18 coincides with the air inlet bore 20 and the outlet bore 16a. Buffer solution in the bore 18 is thereby removed and the stream of buffer can again flow from bore 13a, through bore 17, to bore 15a. Finally, the core 11 is again moved in the direction of the arrow up to the starting position and the process can be repeated.

The size of the applicator, especially the volume of the bore 18, depends upon the sensitivity of the process, the velocity of flow of the buffer solution and possibly the size of the column S. If the bore 18 has capillary dimensions, for simplification of the filling process, there can be provided a corresponding opening in the casing 10 opposite to the filling opening 21. The sample is prevented from running out by surface tension.

The applicator can be made of any desired material, provided that this material is inert to the solutions used and permits a leakproof seating of core 11 in the casing 10. Examples of materials which can be used include glass, synthetic resins and metals. The applicator can also be made of more than one material, for example, of metal with surfaces of a slidable synthetic resin, for example polytetrafluoroethylene.

The applicator can, within the scope of the above-given principle, also be of a different construction, for example, it can be in the form of a cylindrical multiway stopcock. The parallel stream of buffer solution is, in this case, expediently controlled by a second stopcock, the core of which lies in the same axis as the core into which the sample solution is applied.

The process and device according to the present invention provide a number of special advantages. Thus, it is possible to carry out extraordinarily rapid analyses since the measurement result is usually available after only a very short time. Due to the constant stream of liquid, a very stable adjustment of the system is guaranteed, which makes laborious subsequent calibrations superfluous and guarantees constant operational availability. The use of calibrated measurement pipettes is superfluorous so that possibilities of error resulting therefrom are eliminated. Due to the continuous reusing of the enzyme employed, a considerable saving of cost and saving of material is achieved. By a simple changing of the buffer solution, as well as possibly of the carrier-bound enzyme and/or of the detector, the process and device can rapidly be adapted for a different determination.

The following Examples are given for the purpose of illustrating the present invention:

EXAMPLE 1

Determination of D-glucose in serum

Principle:

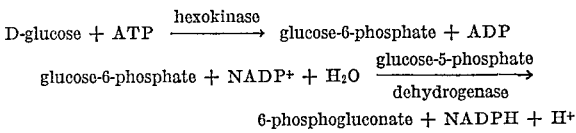

The formation of NADPH is measured in a photometer.

The device illustrated in FIG. 1 of the accompanying drawings was used. The column S, which had a diameter of 1 cm. and a filling height of 1 cm., contained a 2:1 mixture of water-swollen glucose-6-phosphate dehydrogenase on a carrier with a specific activity of 27 U/g. and hexokinase on a carrier with a specific activity of 80 U/g.

As detector, there was used an Eppendorf photometer with flowthrough cell 4053.10. The measurement of the optical density was carried out at 366 nm. An Eppendorf compensation recorder was connected thereto for the registration of the results obtained.

The applicator used had, in principle, the construction shown in FIG. 4 of the drawings. The bore 18 in core 11 had a volume of 10 μl. The applicator was made of V4A steel/Teflon.

The individual parts of the device were connected with silicone tube of 1 mm. internal diameter. The buffer used was 0.3M triethanolamine buffer (pH 7.5) containing 4 mM. magnesium sulfate, 0.44 nM. NADP and 0.59 mM. ATP.

Figure 5:
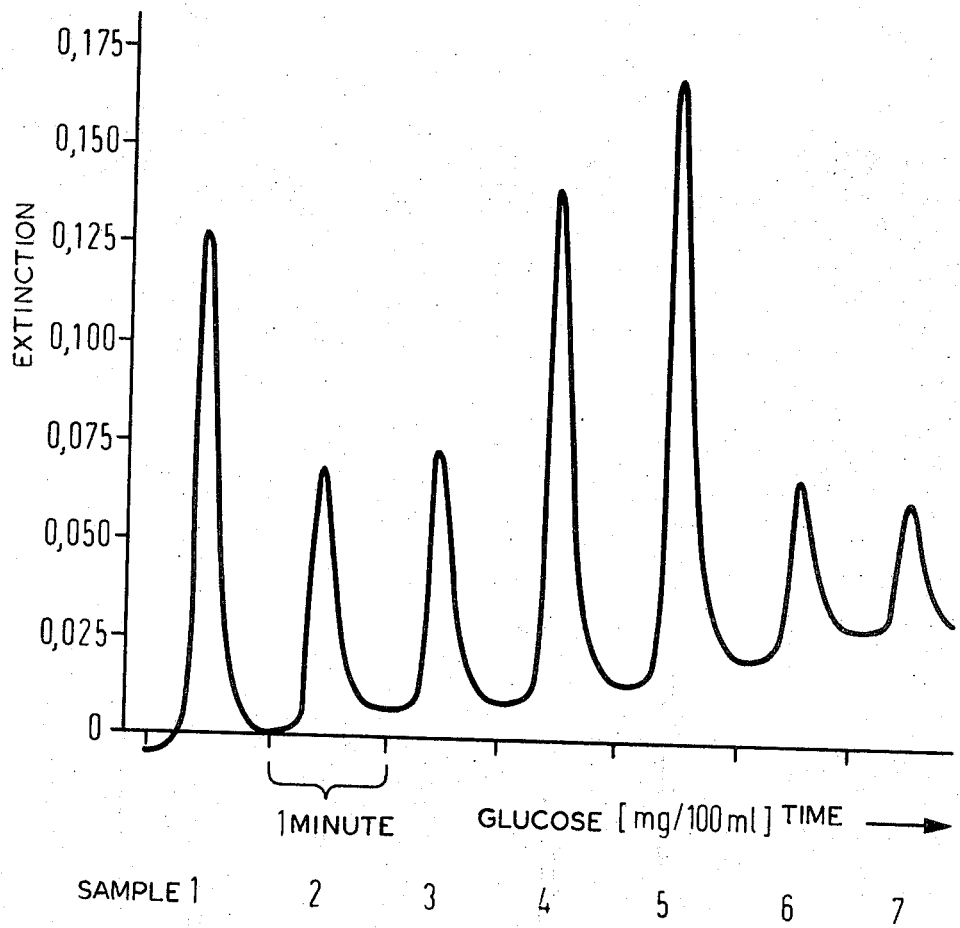
FIG. 5 is a measurement curve obtained by the process of the present invention.
Figure 6:
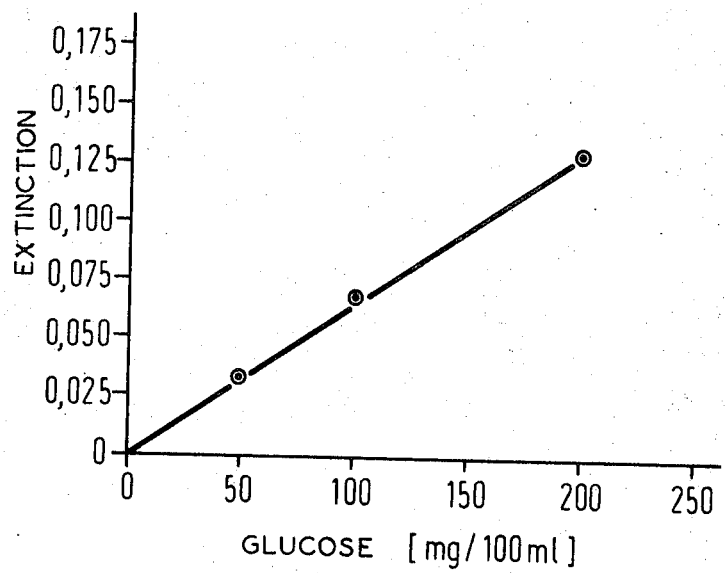
FIG. 6 is the calibrated curve obtained from the measurement curve of FIG. 5.

Serum samples with a definite glucose content were introduced into the applicator at intervals of about 1 minute. Samples 1 and 4 contained 200 mg. glucose/100 ml., samples 2 and 3 100 mg./100 ml., sample 5 300 mg./100 ml. and samples 6 and 7 50 mg./100 ml. FIG. 5 shows the measurement curves recorded on the recording device. The values obtained are illustrated in FIG. 6 as a calibrated curve and show that the height of the peaks above the zero line of the measurement recorder is directly proportional to the glucose content of the solution; under the described experimental conditions, the proportionality range extends up to a concentration of 200 mg./100 ml. The rise of the zero line is due to the fact that NADPH formed becomes enriched in the buffer.

EXAMPLE 2

Determination of D-glucose in serum

This Example is analogous to Example 1, except that the enzyme catalysing the reaction is present in solution. As mixing device S (cf. FIG. 1 of the drawings) there was used a simple glass spiral which had an internal diameter of 2.5 mm. and a path length of 70 cm. The buffer contained, as additional components, 0.12 mg. hexokinase/ml. (16.5 U/ml.) and 0.12 mg. glucose-6-phosphate dehydrogenase (17 U/ml.). The experimental results obtained corresponded to those of Example 1.

EXAMPLE 3

Determination of hexokinase in aqueous solution

Principle:

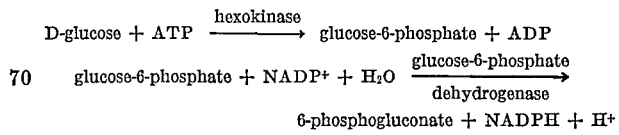

The formation of NADPH is measured in a photometer.

Since the reaction time between the commencement of the reaction and measurement in the detector is constant, the activity of the hexokinase can be deduced from the amount of NADPH formed.

There was used the apparatus illustrated in FIG. 1 of the drawings. The column S had a diameter of 1 cm. and a filling height of 2 cm. and contained water-swollen glucose-6-phosphate dehydrogenase on a carrier with a specific activity of 27 U/g. Between the detector and reservoir was inserted a glass spiral, which had an internal diameter of 2.5 mm. and a path length of 70 cm. This glass spiral was heated in a waterbath to 95° C. It served to inactivate the previously measured hexokinase.

As detector, there was used an Eppendorf photometer with flowthrough cell 4053.10. The measurement of the optical density was carried out at 366 nm. An Eppendorf compensation recorder was connected thereto for the registration of the results obtained.

The applicator used had, in principle, the construction shown in FIG. 4 of the drawings. The bore 18 in the core 11 had a volume of 10 µl. The applicator was made of V4A steel-Teflon.

The individual parts of the apparatus were connected with silicone tube of 1 mm. internal diameter. The buffer used was 0.3 mM. triethanolamine buffer (pH 7.5) containing 4 mM. magnesium sulphate, 0.4 mM. NADP, 0.59 mM. ATP and 20% glucose.

Figure 7:
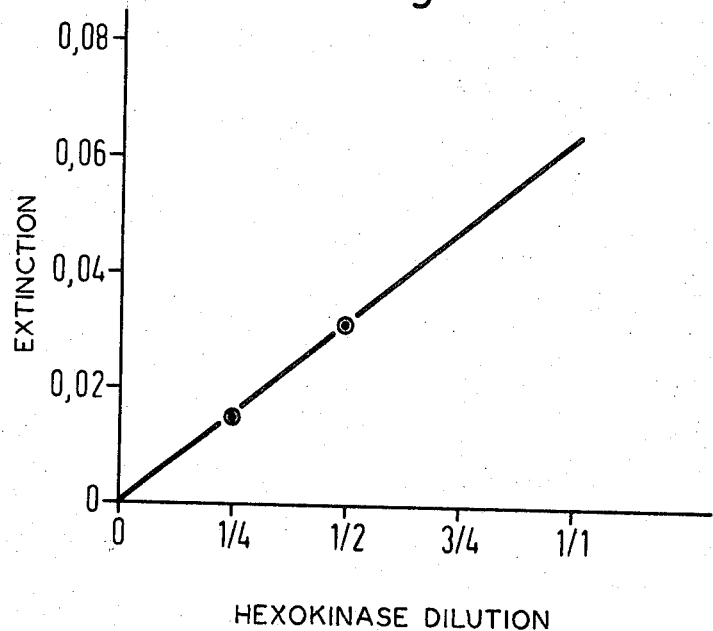
FIG. 7 is a calibrated curve of another embodiment of the present invention.

Samples of aqueous hexokinase solution were introduced into the applicator at intervals of about 1 minute. There were used 1:2 and 1:4 diluted hexokinase solutions, as well as undiluted hexokinase solutions (0.1 mg. protein/ml.). The calibration curve illustrated in FIG. 7 shows the dependency of the height of the peaks on the registration curve upon the introduced hexokinase concentration. It can be seen that a linear dependency exists.

EXAMPLE 4

Determination of D-glucose in serum by means of glucose oxidase, according to the equation:

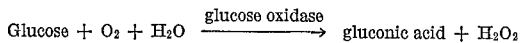

$$\text{Glucose} + O_2 + H_2O \xrightarrow{\text{glucose oxidase}} \text{gluconic acid} + H_2O_2$$

There was used the device illustrated in FIG. 1 of the drawings. The column S had a diameter of 1 cm. and a filling height of 1 cm. and contained water-swollen glucose oxidase on a carrier with a specific activity of 200 U/g.

As detector, there was used an oxygen-sensitive electrode obtainable from the firm W T W of Weilheim, Germany with an oxygen measuring apparatus obtainable from the same firm with the name Oxi 610 E and connected potentiometer recorder Re 5LL of the firm Servogor.

The velocity of flow to the electrode was 7.5 cm./sec. and the diameter of the entry bore in the flowthrough cell, as illustrated in FIG. 2, was 1 mm.

The applicator used had, in principle, the construction shown in FIG. 4 of the drawings. The bore 18 in the core 11 had a diameter of 2 mm. and a length of 10 mm. The applicator was made of glass.

The individual parts of the apparatus were connected together with silicone tube of 1 mm. diameter. The buffer used was 0.2 M. potassium phosphate buffer (pH 6.0) containing 18 mM. potassium iodide, 7.5 mM. ammonium heptamolybdate and 800 mM. sodium chloride.

Figure 8:
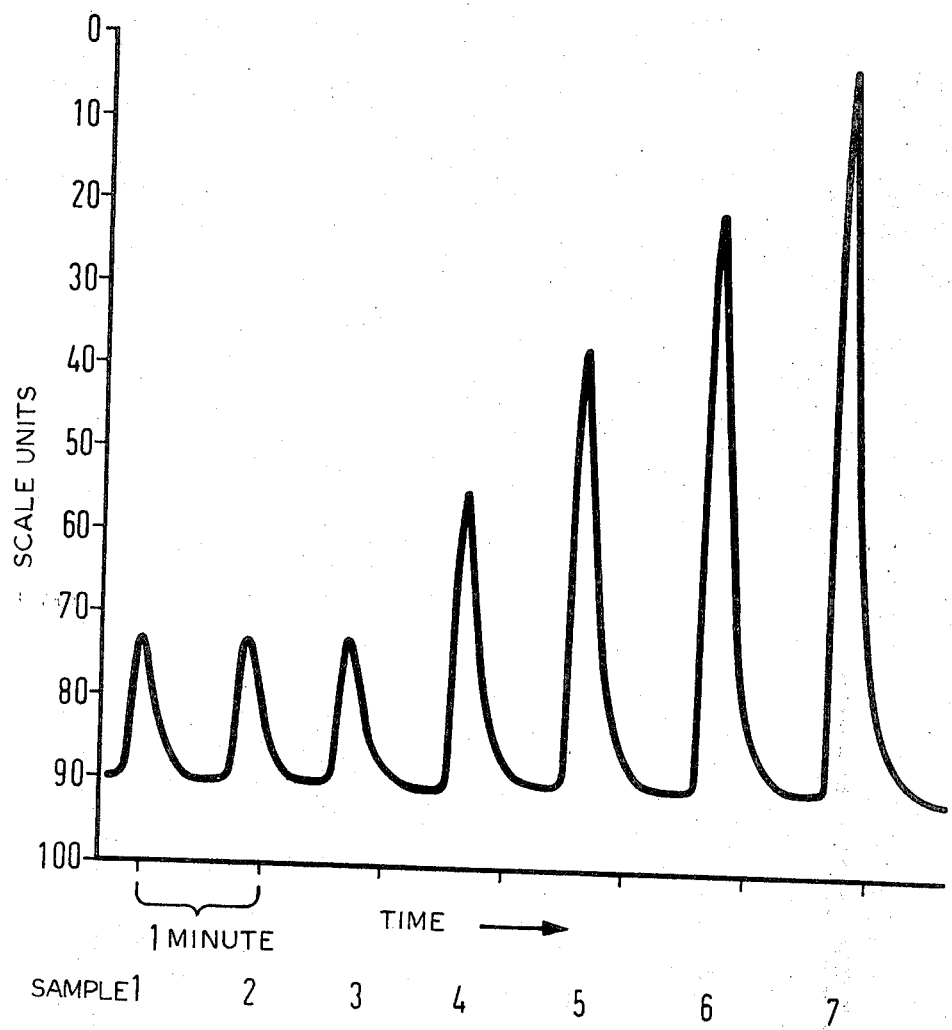
FIG. 8 is a measurement curve for a further embodiment of the present invention.
Figure 9:
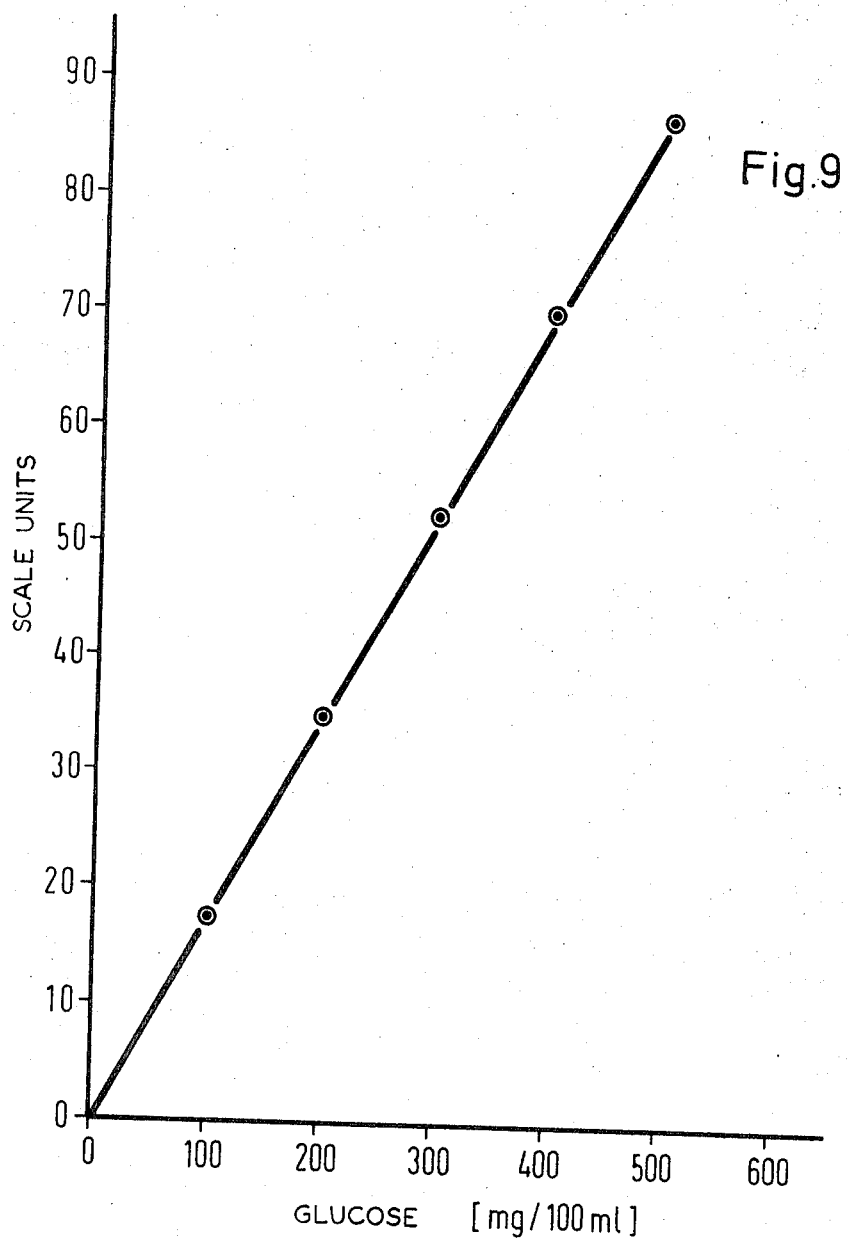
FIG. 9 is the calibrated curve of the measurement curve illustrated in FIG. 8.

Serum samples with a definite glucose content were introduced into the applicator at intervals of about one minute. The samples 1 to 3 each contained 100 mg. glucose/100 ml. serum. Sample 4 contained 200, sample 5 300, sample 6 400 and sample 5 500 mg./100 ml. The measurement curves recorded on the recording device are shown in FIG. 8. The values obtained are reproduced in FIG. 9 as a calibrated curve and show that the height of the peaks above the zero line of the measurement recorder is directly proportional to the glucose content of the sample.

EXAMPLE 5

Determination of uric acid by means of uricase, according to the equation:

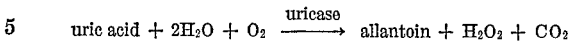

$$\text{uric acid} + 2H_2O + O_2 \xrightarrow{\text{uricase}} \text{allantoin} + H_2O_2 + CO_2$$

The process of Example 4 was used, together with the same apparatus for the determination of uric acid. The column S was filled with uricase on a carrier. The column S had a diameter of 1 cm. and a filling height of 5 cm. The specific activity of the carrier-bound uricase was 3 U/g.

The velocity of flow to the electrode was 3.5 cm./sec. and the diameter of the entry bore in the flowthrough cell, as shown in FIG. 2, was 1 mm.

The applicator used had, in principle, the construction shown in FIG. 4 of the drawing. The bore 18 in the core 11 had a diameter of 2.5 cm. and a length of 13 mm. The applicator was made of glass.

The individual parts of the apparatus were connected with silicone tube of 1 mm. diameter. The buffer used was 0.2 M borate buffer (pH 6.5) in which 600 U/ml. catalase were dissolved.

Samples of uric acid of definite uric acid content were introduced into the applicator at intervals of about 6 minutes. Sample 1 contained 5 mg. uric acid/100 ml., sample 2 10 mg., sample 3 15 mg., sample 4 30 mg., sample 5 45 mg., and sample 6 60 mg./100 ml.

Figure 10:
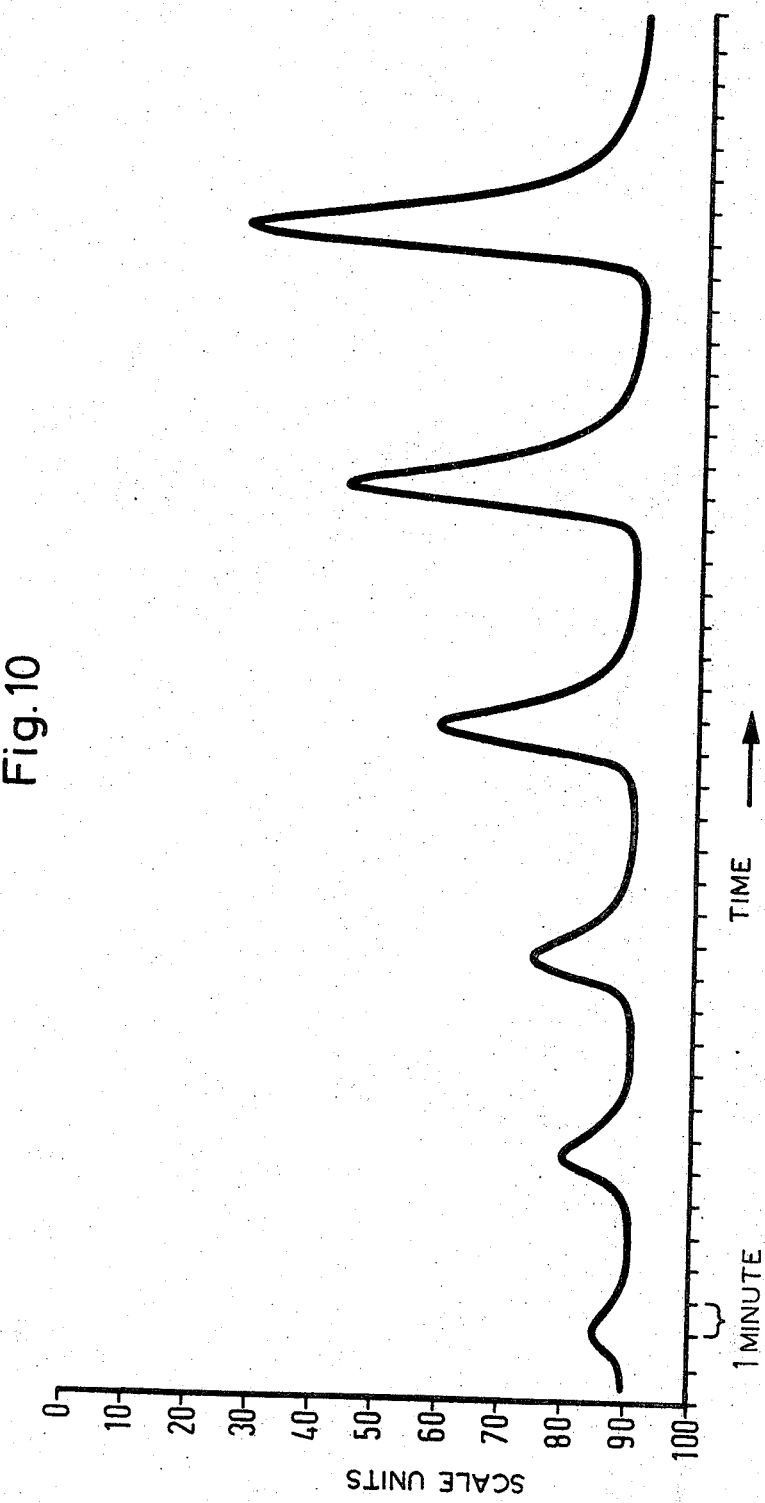
FIG. 10 is a further measurement curve.
Figure 11:
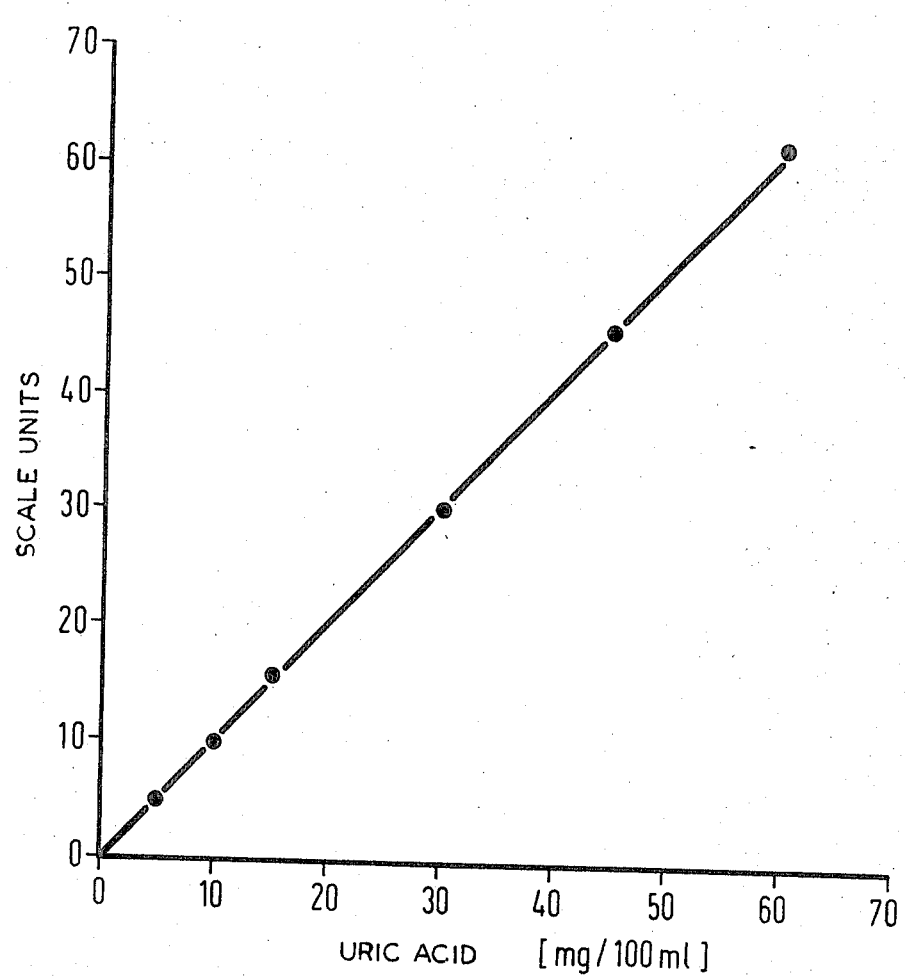
FIG. 11 is a further calibration curve.

The measurement curve recorded on the recording apparatus is shown in FIG. 10 of the drawings. The values obtained are reproduced in FIG. 11 as a calibration curve. It can be seen therefrom that the height of the peaks above the zero line of the measurement recorder is directly proportional to the uric acid content of the sample.

It will be understood that the specification and examples are illustrative but not limitative of the present invention and that other embodiments within the spirit and scope of the invention will suggest themselves to those skilled in the art.

What is claimed is:

1. Process for the quantitative determination of an enzymatically reactive substance in aqueous solution which process comprises introducing a defined amount of an air bubble-free solution containing the substance to be determined block-like into a stream of air bubble-free buffer solution containing the reagents necessary for an enzymatic reaction with said substance, said stream flowing with constant velocity and said introduction not substantially altering the velocity of flow of the buffer solution, contacting the resulting stream with the appropriate enzyme and then passing the stream over detecting means capable of detecting the enzymatic reaction having taken place, and relating the readings from said detector to the amount of said substance to be determined.

2. Process as claimed in claim 1 wherein said stream of buffer solution, after passing over said detecting means, is recycled to receive the solution containing the substance to be determined.

3. Process as claimed in claim 2 wherein said stream of buffer solution is reconstituted after passing said detecting means.

4. Process as claimed in claim 1 wherein said contacting with the appropriate enzyme is effected by passing said stream over a bed of particulate, carrier-bound, insoluble enzyme.

5. Process as claimed in claim 1 wherein said detecting means measures the optical rotation of the solution passing therethrough.

6. Process as claimed in claim 1 wherein said detecting means measures the pH value of the solution passing therethrough.

7. Process as claimed in claim 1 wherein said detecting means measures the evolution of heat of the solution passing therethrough.

8. Process as claimed in claim 1 wherein said detecting means measures the fluorescence of the solution passing therethrough.

9. Process as claimed in claim 1 wherein said detecting means measures the optical permeability of the solution passing therethrough.

10. Process as claimed in claim 1 wherein said detecting means measures the ammonium ion concentration of the solution passing therethrough.

11. Process as claimed in claim 1 wherein the stream of buffer solution is divided into branch streams which are alternatingly interrupted, the solution containing the substance to be determined being introduced into the interrupted branch stream.

12. Apparatus for the quantitative determination of an enzymatically reactive substance in aqueous solution which comprises, in combination, a reservoir containing a buffer solution, connection means including a stream of said buffer solution from said reservoir to sample introduction means, said sample introduction means being adapted to receive a sample containing the substance to be determined and introduce it into the buffer solution, said sample introduction means being provided with at least two throughlets adapted to be closed alternatingly by means of a closure slider with at least two corresponding bores, one of the bores communicating with an inlet pipe for the sample solution when the corresponding throughlet is closed, a mixing device, said mixing device being downstream from said sample introduction means, and, downstream from said mixing means, detection means capable of detecting a physical or chemical property of the stream passing therethrough.

13. Apparatus as claimed in claim 12 wherein additional conduit means is provided for returning the stream issuing from said detection device to said reservoir containing the buffer solution.

14. Apparatus as claimed in claim 12 additionally comprising a pump with constant pumping capacity adapted to maintain a constant velocity flow of buffer solution through said conduit and other components of the apparatus.

15. Apparatus as claimed in claim 12 wherein said sample introduction means is also fitted with vacuum means capable of evacuating said inlet pipe and the bore communicating therewith.

16. Apparatus as claimed in claim 12 wherein said sample introduction means comprises a housing having slidable piston means therein, the housing and piston means having three throughlets which can be respectively brought into communication by displacement of the piston.

17. Apparatus as claimed in claim 12 wherein the sample introduction means comprises a casing with two inlet bores, two corresponding outlet bores, an air inlet bore, a sample inlet bore and vacuum bore, a piston reciprocatingly slidable in said casing and provided with three bores so disposed that sliding the piston causes connection of one of said inlet bores with either one of said outlet bores or connection of said sample inlet bore with said vacuum bore in such a manner that said two inlet bores are not both simultaneously communicating with said two outlet bores.

18. Apparatus as claimed in claim 12 wherein said reservoir is provided with means for the introduction of supplementary reactants thereinto.

19. Apparatus as claimed in claim 12 wherein at least one of the reservoir, mixing means and detection are thermostatically controlled.

20. Apparatus as claimed in claim 12 wherein said detection means is coupled to an amplifier and registration device continuously recording the property of said stream passing through the detection means measured in said detection means.

References Cited

UNITED STATES PATENTS

| | | | |
|---|---|---|---|
| 3,679,312 | 7/1972 | Mansberg | 23—230 B |
| 3,700,562 | 10/1972 | Morgenstern et al. | 195—127 X |
| 3,654,113 | 4/1972 | Bochinski | 23—253 R |
| 3,672,841 | 6/1972 | Freeman et al. | 23—230 PC |
| 3,356,458 | 12/1967 | Steinle et al. | 23—230 R |

OTHER REFERENCES

Hicks et al., "Analy. Chem." *38*(6): 726-730 (1966).

ALVIN E. TANENHOLTZ, Primary Examiner

U.S. Cl. X.R.

195—127, 103.5 C; 23—253 R, 230 B; 137—625.35